Patented Sept. 10, 1935

2,013,710

UNITED STATES PATENT OFFICE 2,013,710

PROCESS OF PRODUCING AROMATIC ALCOHOLS

Marion Scott Carpenter, Nutley, N. J., assignor to Givaudan-Delawanna, Inc., New York, N. Y., a corporation of New York No Drawing. Application May 29, 1933, Serial No. 673,562

5 Claims. (Cl. 260—153)

This invention relates to a process for producing higher alcohols according to the Friedel-Crafts reaction, and more particularly has reference to aromatic alcohols used in the production of perfumes such as phenylethylalcohols, tolylethylalcohols, xylylethylalcohols, cymylethylalcohols, methylbenzyl carbinol or hydratropic alcohols and similar benzyl, tolyl, propyl, xylyl, etc., alcohols.

While the Friedel-Crafts reaction for producing such alcohols is known, that is, reacting on an aromatic benzene hydrocarbon with an aliphatic alkylene oxide in the presence of an acid condensing agent, difficulties are encountered in commercial operation in producing the desired alcohol in high yield without at the same time producing products of undesired side reactions such as chlorhydrins, dibenzyl, etc., especially where aluminum chloride is employed as the most convenient condensing agent. As far as recent researches known to me have gone, it appears that better results are secured at comparatively low temperatures, such as a few degrees below 0 C., but even when operating at low temperatures undesired side reactions producing chlorhydrins and dibenzyl have occurred. Such side products are objectionable because difficult to remove from the desired pure aromatic alcohol, and also because lowering the yield. The yield has comparatively recently been improved by mixing an inert gas with the aliphatic oxide when it is gaseous at the reaction temperature, or by passing an inert gas through the reaction mixture, but in following such process the yield was still below the theoretical yield.

After considerable research and experimentation I have found that for high yield a hitherto unknown relation between the aliphatic oxide and the acid condensing agent is necessary in conjunction with means such as blowing inert gas or air through the reaction mass to reduce the concentration of nascent HCl. I have discovered that where the amount of acid condensing agent is increased relatively to the aliphatic oxide used, that is, so that the acid condensing agent is at least 3.4, and even up to 4 or more, times the aliphatic oxide used, in conjunction with inert gas passed through the reaction mixture, an unexpectedly large and almost theoretical yield of the desired aromatic alcohol is obtained, together with a reduction in side or secondary reaction products such as chlorhydrins, dibenzyl, etc. The products of this process are of a high initial purity in addition to the high yields, and can be easily freed of such impurities as are formed, and are of wide utility in perfume manufacture.

Without limiting myself thereto, as I consider that I have discovered a type of reaction applicable in general to a number of Friedel-Crafts reactions, the following examples employing parts by weight will illustrate the invention:

Example I 1000 benzol and 500 aluminum chloride are mixed, the temperature lowered to 5° C. and while stirring well 128 ethylene oxide and an equal amount of air are introduced. After pouring the reaction mixture into cold water, or over ice, washing and neutralizing, the residue on distillation yields 256 grams of phenyl ethyl alcohol.

Example II 700 toluol and 400 $AlCl_3$ are treated in the usual manner with 92 ethylene oxide diluted with an approximately equal volume of inert gas, such as air. After decomposing in the usual manner and distilling there is obtained about 225 of $\beta$-tolylethyl alcohol, a colorless oil of faintly aromatic odor boiling at 100° C. under 5 mm. vacuum.

Example III 1000 meta xylene and 540 $AlCl_3$ are treated as in Example I with 120 ethylene oxide. After working up in the usual manner there is obtained about 310 of $\beta$-m-xylylethyl alcohol, a colorless oil of faintly aromatic odor boiling at 110–113° under 4 mm. vacuum.

Example IV 700 p-cymene and 350 $AlCl_3$ are treated as above with 81 ethylene oxide. After working up as before there is obtained about 165 of $\beta$-(p-cymyl)ethyl alcohol, a yellow oil of aromatic odor, boiling at 125–135° C. at 5 mm. vacuum.

Example V 1000 benzol and 450 $AlCl_3$ are treated as before with 132 propylene oxide dissolved in an equal weight of benzol. After working up in the usual manner there is obtained about 230 of methyl benzyl carbinol or hydratropic alcohol (or a mixture of both), a colorless aromatic oil boiling at 90–100° C. under 4 mm. vacuum.

The foregoing examples only purport to state a few materials, proportions, and temperatures contemplated by the invention, it having been found that the process holds for various materials at various temperatures as high as 40° C., but in general lower reaction temperatures are preferable.

Where the aliphatic oxide is gaseous at the reaction temperature, the inert gas or air can be mixed with the oxide before it is admitted to the reaction space or can be fed separately; and in cases where the oxide may be liquid at the reaction temperature the inert gas or air will be bubbled through the reaction mixture.

For carrying out the process of this invention in the presence of excess as stated, of acid condensing agent, yields as high as 170 are obtained, in comparison with a process using not over three times the acid condensing agent relatively to the aliphatic oxide giving yields of around 100, thus showing that unexpected and non-obvious substantial increase in yield is obtained by increasing the amount of acid condensing agent relatively to the aliphatic oxide.

The invention is not to be restricted to particular materials, proportions or temperatures except as required by the scope of the appended claims.

The invention claimed is:

1. Process for the manufacture of aromatic alcohols, comprising reacting an aromatic benzene hydrocarbon with an aliphatic alkylene oxide and an acid condensing agent in an amount at least 3.4 times the aliphatic oxide used.

2. Process for the manufacture of aromatic alcohols, comprising reacting an aromatic benzene hydrocarbon with an aliphatic alkylene oxide in the presence of an inert gas and an acid condensing agent in an amount between 3.4 and about 4 times the aliphatic oxide used.

3. Process for the manufacture of aromatic alcohols, comprising reacting an aromatic benzene hydrocarbon with an aliphatic alkylene oxide in the presence of an inert gas and an acid condensing agent in an amount between 3.4 and about 4 times the aliphatic oxide used at a temperature between about —5° C. and about 40° C.

4. Process for the manufacture of phenyl ethyl alcohol, comprising reacting benzol with ethylene oxide at a temperature lowered to below 10° C. in the presence of an inert gas and aluminum chloride in an amount between 3.4 and about 4 times the amount of ethylene oxide.

5. Process for the manufacture of aromatic alcohols, comprising reacting an aromatic benzene hydrocarbon with an aliphatic alkylene oxide in the presence of an inert gas and an acid condensing agent in an amount at least 3.4 times the aliphatic oxide used.

MARION SCOTT CARPENTER.